(12) United States Patent
Filipek et al.

(10) Patent No.: US 11,921,853 B2
(45) Date of Patent: Mar. 5, 2024

(54) SYSTEM FOR ADAPTIVE VEHICLE SECURITY AND RESPONSE

(71) Applicant: Denso Corporation, Kariya (JP)

(72) Inventors: Stefan Filipek, Novi, MI (US); Remma Takeuchi, Cupertino, CA (US)

(73) Assignee: Denso Corporation (JP)

( * ) Notice: Subject to any disclaimer, the term of this patent is extended or adjusted under 35 U.S.C. 154(b) by 399 days.

(21) Appl. No.: 16/519,167

(22) Filed: Jul. 23, 2019

(65) Prior Publication Data
US 2021/0026958 A1 Jan. 28, 2021

(51) Int. Cl.
*G06F 21/56* (2013.01)
*G06F 21/55* (2013.01)

(52) U.S. Cl.
CPC ............ *G06F 21/56* (2013.01); *G06F 21/554* (2013.01)

(58) Field of Classification Search
None
See application file for complete search history.

(56) References Cited

U.S. PATENT DOCUMENTS

| | | | |
|---|---|---|---|
| 6,847,864 B2 | 1/2005 | Goto et al. | |
| 7,607,174 B1 | 10/2009 | Kashchenko et al. | |
| 9,167,550 B2 | 10/2015 | Mahaffey et al. | |
| 9,527,384 B2 | 12/2016 | Bando et al. | |
| 9,560,071 B2 | 1/2017 | Ruvio et al. | |
| 2009/0222877 A1* | 9/2009 | Diehl | H04L 63/0263 726/1 |
| 2012/0284779 A1 | 11/2012 | Ingrassia, Jr. et al. | |
| 2015/0081186 A1 | 3/2015 | Yasui et al. | |
| 2017/0262756 A1 | 9/2017 | McElhinney et al. | |
| 2017/0295188 A1* | 10/2017 | David | G06F 21/54 |
| 2018/0007076 A1 | 1/2018 | Galula et al. | |
| 2018/0191738 A1* | 7/2018 | David | G06F 21/55 |
| 2018/0300477 A1 | 10/2018 | Galula et al. | |
| 2018/0307840 A1* | 10/2018 | David | G06F 21/64 |
| 2018/0316699 A1* | 11/2018 | David | H04L 63/20 |
| 2018/0351980 A1 | 12/2018 | Galula et al. | |
| 2019/0036948 A1 | 1/2019 | Appel et al. | |
| 2019/0052653 A1* | 2/2019 | Galula | G06F 21/55 |
| 2019/0071056 A1* | 3/2019 | Choi | H04L 63/1416 |
| 2019/0141070 A1 | 5/2019 | Tsurumi et al. | |
| 2019/0260800 A1* | 8/2019 | Shalev | H04L 63/0823 |
| 2019/0306187 A1* | 10/2019 | Dyakin | H04W 12/122 |
| 2019/0312892 A1* | 10/2019 | Chung | G06F 21/85 |
| 2019/0332823 A1* | 10/2019 | Kwon | G06F 21/85 |
| 2020/0034574 A1 | 1/2020 | Baltes et al. | |
| 2020/0216097 A1* | 7/2020 | Galula | G06F 21/52 |
| 2020/0274851 A1* | 8/2020 | Qiao | B60R 16/0231 |

(Continued)

FOREIGN PATENT DOCUMENTS

| | | |
|---|---|---|
| DE | 10329196 A1 | 1/2005 |
| DE | 102015001971 A1 | 8/2016 |

(Continued)

*Primary Examiner* — Christopher C Harris
(74) *Attorney, Agent, or Firm* — Dickinson Wright PLLC

(57) ABSTRACT

A vehicle computer system includes one or more sensors configured to receive input regarding a vehicle's environment, and a controller in communication with the one or more sensors of the vehicle. The controller is configured to identify a cyber-attack on one or more vehicle controllers in the vehicle, and respond to the cyber-attack based upon at least the vehicle environment.

20 Claims, 4 Drawing Sheets

(56) References Cited

U.S. PATENT DOCUMENTS

| | | | | |
|---|---|---|---|---|
| 2020/0389474 | A1* | 12/2020 | Levy | H04L 63/1416 |
| 2020/0413264 | A1* | 12/2020 | Han | H04W 12/68 |
| 2021/0006571 | A1* | 1/2021 | Yi | H04L 63/20 |
| 2021/0075800 | A1* | 3/2021 | Paraskevas | H04W 4/48 |

FOREIGN PATENT DOCUMENTS

| | | | | |
|---|---|---|---|---|
| EP | 3291119 | A1 * | 3/2018 | G06F 21/88 |
| EP | 3248844 | B1 | 1/2019 | |
| JP | 2019075056 | A | 5/2019 | |

* cited by examiner

SYSTEM FOR ADAPTIVE VEHICLE SECURITY AND RESPONSE

TECHNICAL FIELD

The present disclosure relates to cybersecurity in a vehicle system.

BACKGROUND

Vehicles may be equipped with cybersecurity systems that are equipped to protect a vehicle's computer system from a cyber-attack. Vehicles may be driven in different circumstances and situations. For example, a vehicle may be driven to work in one circumstance but may be driven to a home location in another circumstance.

SUMMARY

According to one embodiment, a vehicle computer system includes one or more sensors configured to receive input regarding a vehicle's environment, and a controller in communication with the one or more sensors of a vehicle. The controller is configured to identify a cyber-attack on one or more vehicle controllers in the vehicle, and respond to the cyber-attack based upon at least the vehicle environment.

According to another embodiment, a vehicle computer system includes one or more sensors configured to receive input regarding a vehicle's environment. The vehicle computer system may also include a controller in communication with the one or more sensors of a vehicle. The controller is configured to identify a vehicle security protocol, including parameters to activate response to the input regarding the vehicle's environment, and activate the vehicle security protocol.

According to yet another embodiment, a vehicle computer system includes one or more sensors configured to receive input regarding a vehicle's environment, a security controller in communication with the one or more sensors of the vehicle. The controller is configured to identify a cyber-attack on one or more vehicle controllers in the vehicle, respond to the cyber-attack based upon at least the vehicle environment, determine a vehicle security protocol to activate, including parameters to activate or deactivate vehicle controllers configured to communicate with external devices, in response to the input regarding the vehicle's environment, and activate the vehicle security protocol.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A security system may include an embodiment that adapts the vehicle security posture to optimize resource utilization versus security. Various vehicle inputs may be utilized to update the security posture. For example, battery level, central processing unit (CPU) resources, and memory resources (among other inputs) may be utilized. Thus, the security may control the state of the core vehicle services and/or security services based on the past, present, and/or assume future state of the vehicle. Threats to the vehicle may change based on its state, location, etc. The priority of vehicle services may change based on the user's demand (using radio, navigation, streaming video, phone call, etc.) Thus, the vehicle security level may change based on a past state of the vehicle, present state of the vehicle, or future state of the vehicle. Thus, a system is disclosed that may provide one layer of security.

A second layer of security may be added in case of a cyber-attack, according to one embodiment. If a vehicle detects a cyber-attack by an in-vehicle HIDS (Host-based Intrusion Detection System), or a NIDS (Network-based Intrusion Detection System) the vehicle may need to take responsive action to address the incident. For example, the vehicle may attack the process that is undertaking the cyberattack, reboot the attacked CPU, or conduct other actions during a cyberattack. Since the appropriate responsive action depends on the vehicle situation at the point that the cyberattack is detected and the type of detected attack, the vehicle should consider both perspectives together when determining the responsive action.

Figure 1A:
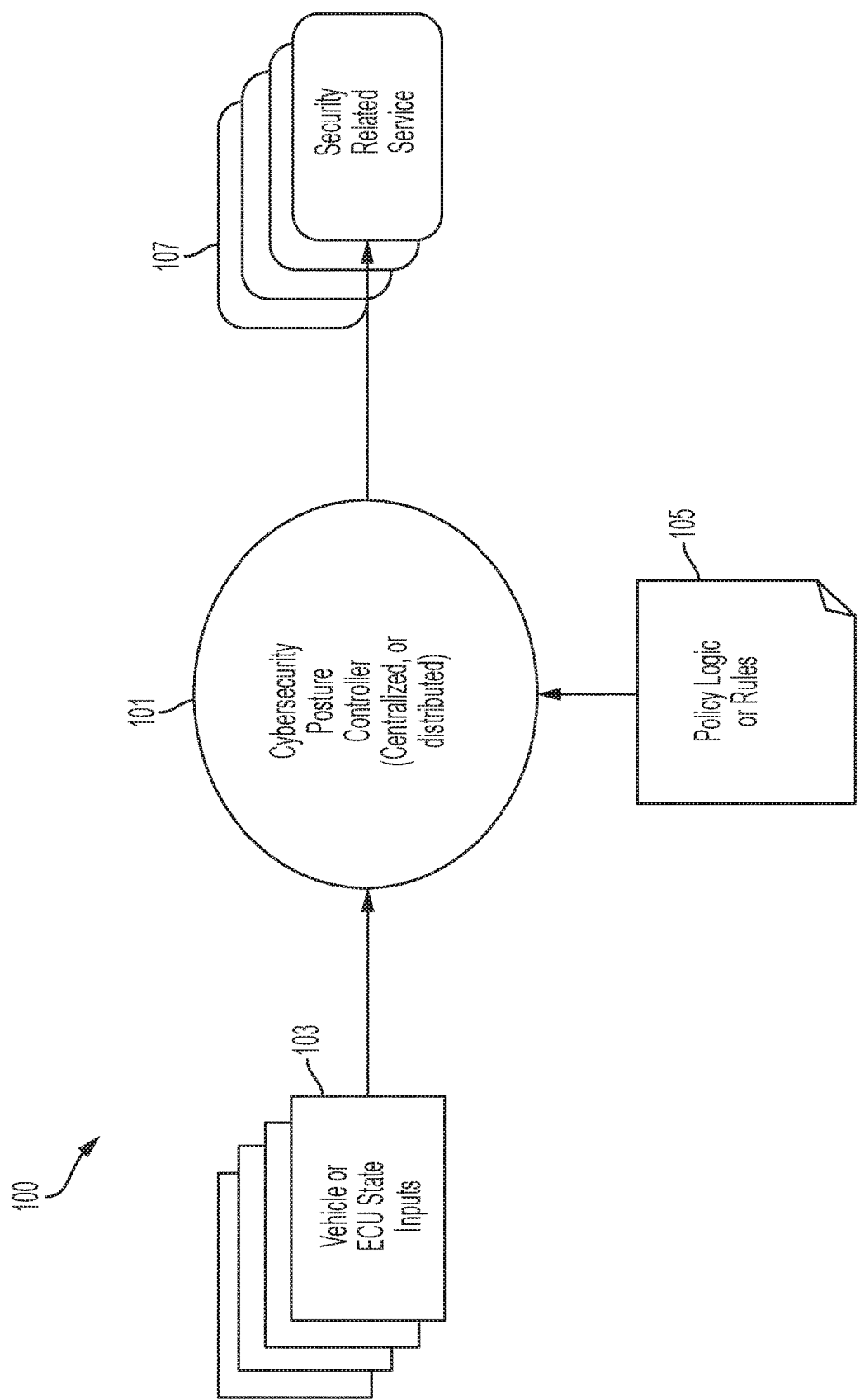
FIG. 1A illustrates a system 100 overview of a present embodiment.

FIG. 1A illustrates a vehicle cybersecurity system 100 overview of a present embodiment. The system may be applied to any type of vehicle, such as a passenger vehicle, a commercial vehicle, motorcycle, etc.). The vehicle system 100 may include a cybersecurity posture controller 101 (also referred to as a cybersecurity controller 101) or any other type of controller. The controller 101 (e.g., cybersecurity controller 101) may change the attributes of a security related service to meet the needs of the desired security posture. For example, the controller 101 may enable/disable security service all together, prioritize a security service, modify security ruleset (e.g., filter rules, call graphs, etc.), enable/disable vehicle attack surface (Bluetooth, Wi-Fi, Cellular, etc.) when a certain aspect of the vehicle is attacked.

The system 100 may utilize various vehicle inputs 103 or electronic control unit (ECU) state inputs 103 utilized to update the security state. In one example, the system 100 may identify the state of the key (or fob)/ignition. For example, the system 100 may determine if the ignition is on/off, the battery is on/off, adaptive cruise control (ACC) is on/off. Another input may be the ECU resource utilization.

Other inputs may include the geographic location of the car (e.g., global positioning system (GPS) location), vehicle speed, vehicle acceleration, wireless signal environment (SSIDs, Bluetooth, Nearfield Communication, etc.), proximity to other vehicles (e.g., radar or proximity data collected from various cameras, radar sensors, Lidar sensors, etc.), user-chosen vehicle mode, the number of passengers (e.g., passenger data based on seat-belt data or weight sensor data), specific drivers (occupant data identifiers based on phone pairing, key fob, etc.), synchronized activity schedule data (e.g., identify appointments, meetings, scheduled activities, etc.), time of data, autonomous driving mode (e.g., full autonomous driving, semi-autonomous driving (steering and speed, or some braking situations, etc.), etc. For example, the GPS location may be associated with a work location, home location, familiar location (e.g., family or friends house), etc. The security protocol may adjust based on the location of the vehicle.

The cybersecurity controller 101 may also be in communication with a policy logic 105 or rules 105 to be applied. The policy logic 105 may be discussed in more detail with respect to the use cases described below, or the flowchart described in FIG. 4. The policy logic 105 may describe some of the security measures that the vehicle system 100 may incorporate based on the vehicle context to either heighten or lessen security standards. For example, more security protocols may be implemented when the vehicle is in a foreign territory or area that the vehicle is not familiar with. In another example, the vehicle may lessen security standards when the vehicle is near a home location or near an authorized dealership.

Security related services 107 may also be controlled by the cybersecurity controller 101 (or any other type of controller or processor). For example, the system 100 may utilize the inputs 103 and the logic/rules 105 to identify how the security system 100 of the vehicle may be configured to detect, prevent, mitigate, or respond to attacks. The security related services 107 may relate to how various vehicle controllers, settings, and other applications and features are either turned on or off. For example, certain security services 107 may turn off wireless communication with outside devices or in-vehicle mobile devices. Furthermore, it may discuss how policies are adjusted for those various controllers, settings, and other applications.

Figure 1B:
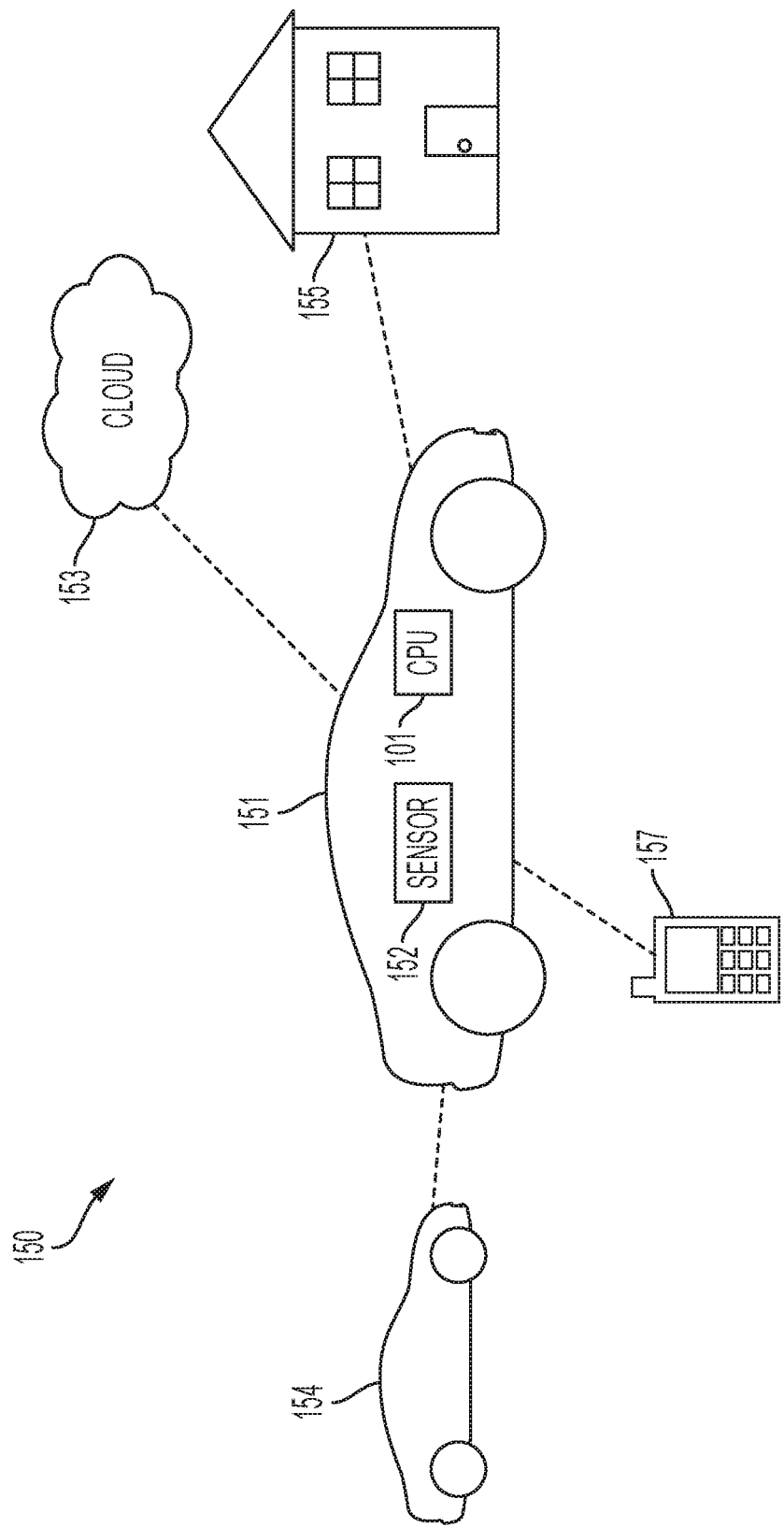
FIG. 1B illustrates a system 150 overview of an alternative embodiment that communicates with other vehicles and a home network.

FIG. 1B illustrates a system 150 overview of an alternative embodiment that communicates with other vehicles and a home network. A vehicle 151 may be equipped with the system 100, which includes cybersecurity controller 101. The vehicle 151 may be in communication with a "cloud" server 153 via an on-board modem or any other type of cellular communication module. The cloud 153 may allow for various off-board services and data to be communicated to the vehicle 151. For example, the cloud 153 may communicate weather information, traffic information, or any other type of information for the cybersecurity controller 101 to analyze or utilize in security protocols.

Furthermore, the vehicle 151 may be in communication with a home network 155, or other type of building (e.g., office, commercial building, residential building, etc.). The vehicle 151 may communicate with the home 155 to send and receive data to and from the home 155. For example, the vehicle 151 may connect to a WiFi network of the home 155. The vehicle 151 may also interact with smart devices located in the home 155, such as a thermostat, camera, appliances, electrical plugs and outlets, and other smart-home applications.

Last, the vehicle 151 may be in communication with a mobile device 157. The mobile device 157 may be a mobile phone, tablet, smart watch, laptop, or other device. The vehicle system 150 may be in communication with the mobile device 157 via Bluetooth communication or a wireless connection. The vehicle 151 may utilize the mobile device 157 to connect to remote systems as well.

The vehicle 151 may also be equipped with one or more sensors 152 to identify other vehicles or to detect objects. For example, the vehicle 151 may be equipped with RADAR, LIDAR, cameras, or other sensors that allow for detection of objects. The vehicle 151 may utilize the sensors to detect moving objects, as well as stationary objects. The vehicle 151 may also be equipped with a sensor 152 or vehicle transceiver to allow for V2V (vehicle-to-vehicle) communication with other vehicles 154.

Figure 2:
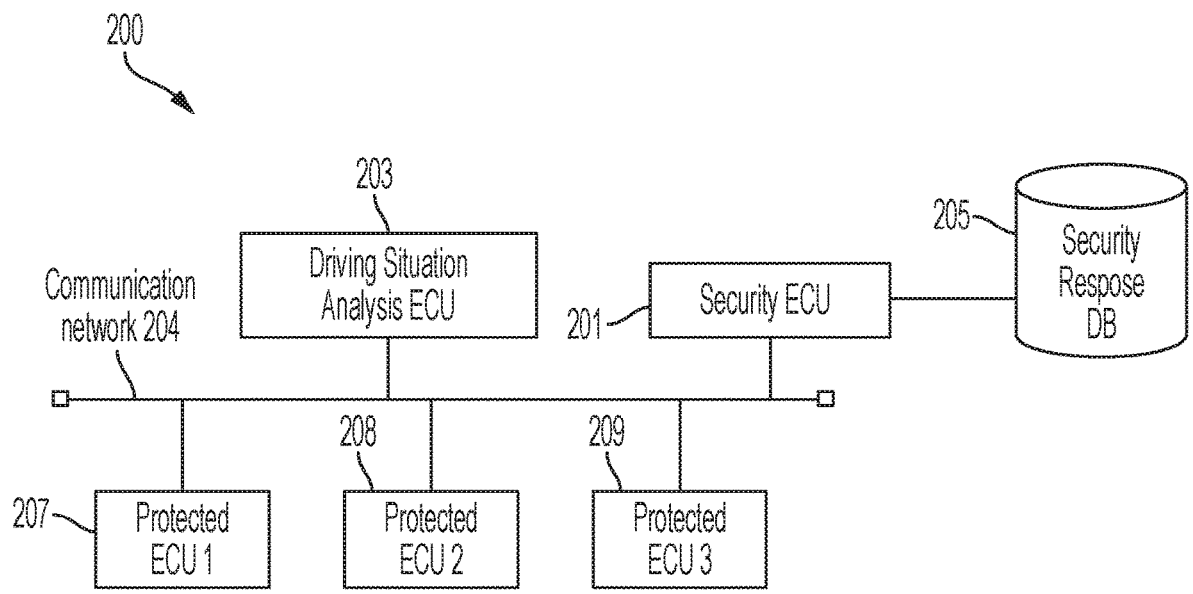
FIG. 2 illustrates a system overview of another embodiment of the vehicle cybersecurity system of FIG. 1A.

FIG. 2 illustrates a system overview of another embodiment of a vehicle cybersecurity system 200 of FIG. 1A. The vehicle may include a cybersecurity ECU 201 or cybersecurity controller 201 to focus on cybersecurity prevention and response to attacks. The cybersecurity controller 201 may provide the same or similar function to the controller 101 described with respect to FIG. 1A. Thus, at a high-level, the cybersecurity controller 201 may have software to analyze data and other inputs to prevent cyber-attacks and respond to cyber-attacks. The cybersecurity controller 201 may be in communication with a driving situation analysis (DSA) ECU 203 or driving situation analysis (DSA) controller 203. The DSA controller 203 may be in communication via a communication network 204 (e.g., controller area network (CAN) bus) or wireless communication with various vehicle sensors and inputs (e.g., a GPS sensor, "cloud" based server, vehicle speed input, etc.) that provide data to the DSA controller 203. The DSA controller 203 may provide an abstracted driving environment information, rather than raw data from other ECUs or sensors. The DSA controller 203 may be implemented by using a symbolization technique. The DSA controller 203 may predict the vehicle environment in the near feature, and the information may be utilized to determine the responsive action. The data provided to the DSA controller 203 may be utilized to identify certain driving conditions for the vehicle. For example, the DSA controller 203 may analyze the vehicle speed, the function class of a road that the vehicle is on, or other vehicle states.

The cybersecurity controller 201 and the DSA controller 203 may be in communication with multiple protected ECUs, such as protected ECU 207, protected ECU 208, protected ECU 209. The protected ECUS 207, 208, 209 may be composed of a basic function, host-based intrusion detection system (HIDS), control flow integrity (CFI), data flow integrity (DFI), etc.). When the HIDS detects an attack, the ECU may report it to the cybersecurity controller 201 with detailed information. For example, the protected ECU 207 may provide data to the cybersecurity controller 201 with information regarding a memory map, register, trace information, executed line of code, attacked surface and/or protocols (e.g., Bluetooth, Wi-Fi, USB, etc.) and other state information, etc. Thus, the cybersecurity controller 201 may be provided with detailed information regarding the cyber-attack to identify how to properly respond to the attack.

A security response database 205 may be a database that includes various options of how the system can respond during an attack. The database may outline various scenarios of security protocols to activate in case of a cybersecurity attack. As explained further with respect to FIG. 3, the system security response database 205 may prescribe certain responses based on the type of attack and the scenario of the vehicle.

Figure 3:
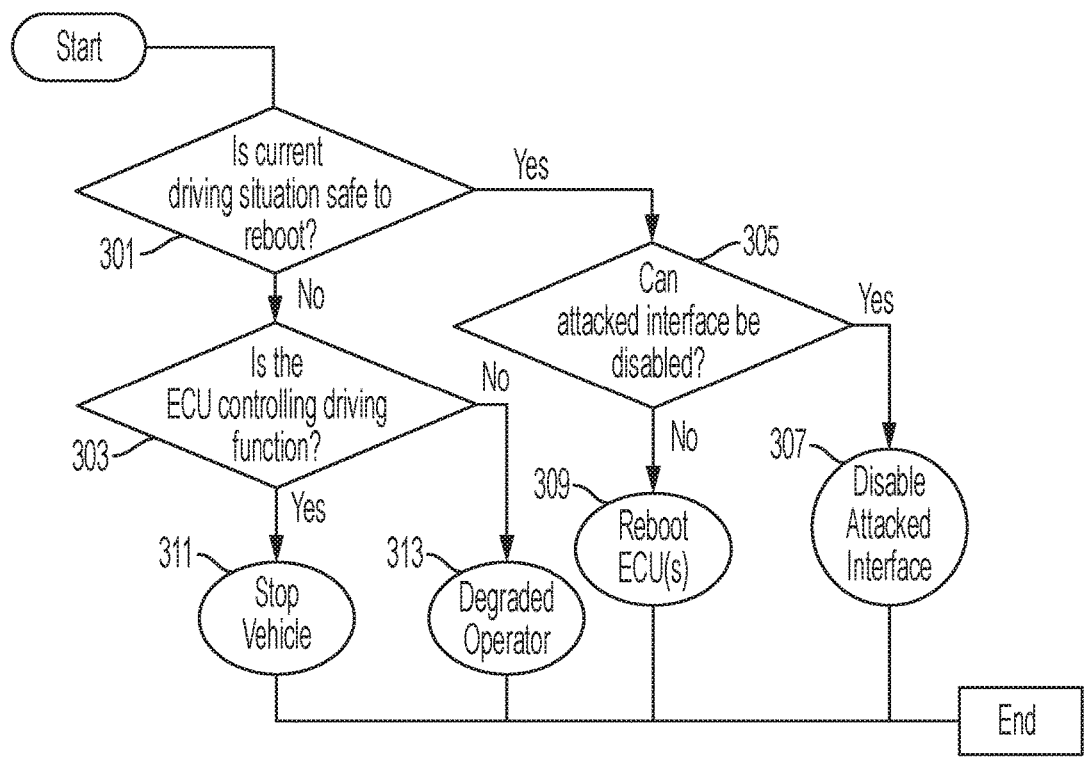
FIG. 3 illustrates a flowchart of a vehicle cybersecurity system responding to a cyberattack.

FIG. 3 illustrates a flowchart of a vehicle cybersecurity system responding to a cyberattack. Thus, the flowchart may be an embodiment of a vehicle that is currently under a cyber-attack. The flowchart may be exemplarity of an algorithm in a cybersecurity controller. At decision 301, the system may analyze whether the vehicle is in a current driving situation that is safe to reboot. For example, the controller may be in communication with various vehicle controllers in communication with vehicle sensors. The vehicle sensors collect data to determine various vehicle states or conditions of the vehicle's environment. For example, the vehicle sensors may utilize GPS location or speed signal data to determine that the vehicle is driving on a freeway at a high speed. The system may have various use cases scenarios or thresholds to determine if the vehicle is in a safe driving environment to reboot the vehicle system in the scenario of a cyber-attack. A reboot may allow the cyberattack to cease attacking, or mitigate damage of the attack, in certain situations. For example, if the system identifies that the vehicle is on a freeway or high speed road (e.g., threshold speed of 50 miles per hour (MPH) is exceeded), the system may recognize the situation where the vehicle is stopping for a traffic jam or at a traffic intersection (e.g., for red traffic signal). And if the expected reboot time (which may be stored in the database) is short enough, the system may reboot the processor or ECU. To determine if the reboot time is short enough, the expected restart time (e.g., timing when traffic light becomes green) could be provided by the DSA to predict the driving situation of a feature, or other factors such as communication with a traffic signal or other infrastructures.

In one scenario of a cyberattack, the system may have determined that it was not safe for a system reboot. In such a scenario, the system may determine at step 303 if the vehicle controller that is being attacked is controlling one or more driving functions of a car. The driving functions may include, steering of the vehicle, acceleration, braking, etc. For example, the system may determine if a cyber-attacker has the potential to take-over vehicle control of an autonomous vehicle, as well as a manually-operated vehicle. If the vehicle controller (e.g., vehicle ECU) is not taking control of the driving function, the system may determine to degrade operation of the vehicle at step 313. For example, the vehicle's autonomous systems may stay in control of driving the vehicle, however, it may turn off the attacked ECU/controller or cease operation of all software on the attacked ECU/controller. In another example, the system may degrade operation of the vehicle by slowing down the vehicle speed if it is determined safe to do so. The vehicle system may look to the security response database 205 to determine the appropriate action to take in such scenarios. However, in another scenario, if the vehicle controller being attacked is taking control of the driving function (for example, steering, acceleration, braking, etc.) in the vehicle, the system may either shutdown the commands for that controller/ECU (e.g., fail operation of that controller) or stop the vehicle and prevent the vehicle from moving, as shown in step 311.

In another scenario of a cyber-attack, the system may have determined (for example at step 301) that it is okay to conduct a system reboot for the vehicle. In such a scenario, the system may analyze the vehicle environment and determine that rebooting, which may include shutting down and/or restarting the system, may be okay given the current vehicle environment (e.g., the input regarding the vehicle environment is below a threshold). Such scenarios that may allow for a reboot may include that the vehicle is being parked or that the vehicle is in neutral, the vehicle being driven at very low speeds, or identifying no vehicles, pedestrians, or objects near the vehicle (e.g., utilizing vehicle sensors such as cameras, radar, LIDAR, etc.), nearby. In the scenario when it is determined that it is proper to reboot the vehicle, the system may determine if the vehicle attack interface can be disabled at step 305. For example, the system may determine if the vehicle environment allows for the attacked interface to be disabled, or if the attacked interface is a non-critical processor that can be disabled. If it is determined that the attacked interface can be disabled, the system may reboot only the attacked ECU(s) in order to disable the identified attacked interface at step 307. For example, if the attacked ECU has external interfaces such as Wi-Fi or Bluetooth controller, and those interfaces are not necessary to maintain driving functions, the system may identify that the interface could be disabled. If it is determined that the attacked interface cannot be disabled, the system may reboot all of the vehicle ECU(s) at step 309. For instance, if the attacked ECU has an internal communication interface, such as the CAN bus or Ethernet within the vehicle, and the attacked ECU is controlling the vehicle behavior, the system may identify that the interface could not be disabled.

Figure 4:
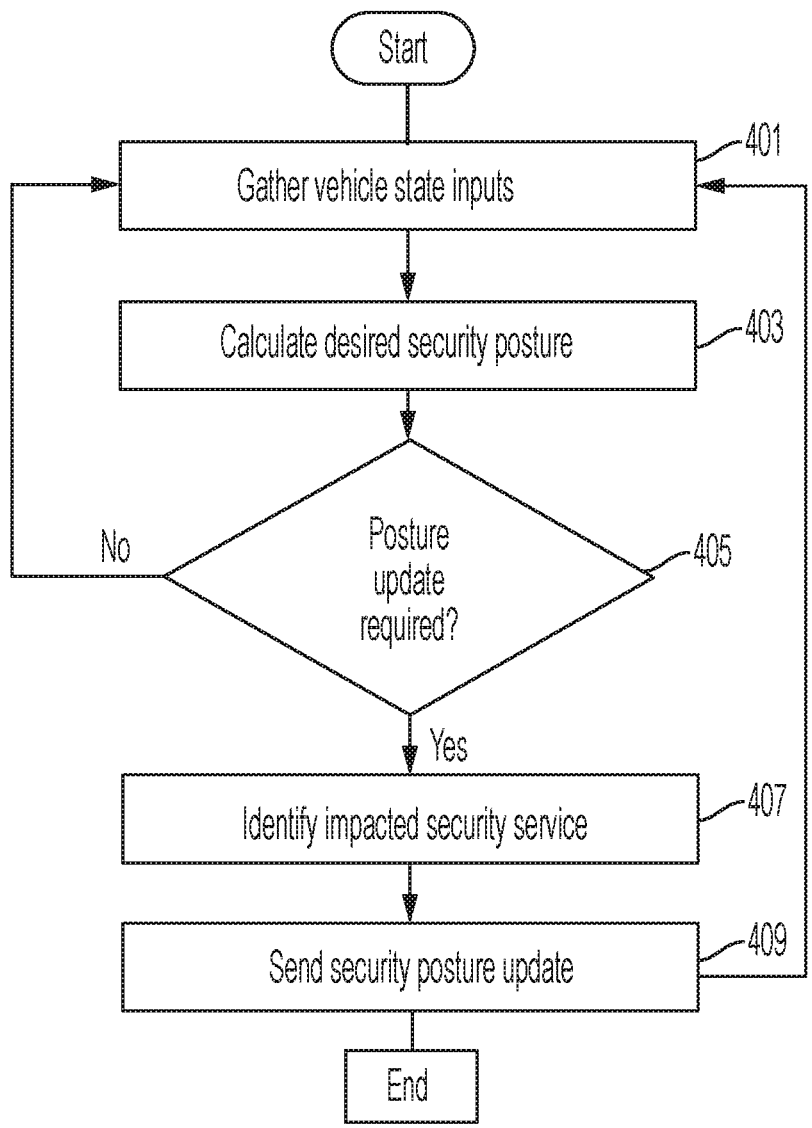
FIG. 4 illustrates a flowchart of an embodiment of an adaptive security update.

FIG. 4 illustrates a flowchart of an embodiment of the adaptive security update. The system of FIG. 4 may not be under a cyberattack, unlike the scenario illustrated in FIG. 3. Thus, the security responses here are preemptive attempts to balance security with usability or performance. At step 401, the system may gather the vehicle and/or environmental state inputs. A cybersecurity controller 101 may be in communication with various vehicle sensors (for example, the sensors 103) or other vehicle inputs (or external inputs, such as "cloud" based data providers) via the communication network 204 (e.g., CAN bus).

At step 403, the system may calculate the best suited security posture. The system may utilize the states of the vehicle identified by the various sensors to identify how the vehicle's security posture should adapt to the vehicle state. For example, a certain vehicle security protocol may be executed if a vehicle sensor identifies that the vehicle is near a home location or a work location. In another scenario, a stricter security protocol may be executed when the vehicle is near a hacker conference, for example. The system may then transition the vehicle security posture via edge-based (only when an input actually changes) or polling based. The desired security posture can be calculated based on vehicle state inputs directly or derivative values, such as perceived security risks, required vehicle performance, required resource utilization, or user desired modes. For example, various security risks may be assigned points and calculated to determine risk, such as a wireless connection with a user's device may be assigned relatively low points, but a wireless connection to an outside unknown connection may be assigned higher points. The implementation of such an algorithm can be through any number of methods, including but not limited to hard-coded logic, lookup tables, databases, machine learning, or other artificial intelligence algorithms. Such algorithms can also be predictive such that they calculate a desired future security posture.

At decision 405, the system may determine if the security posture update is required. The system will analyze the desired security posture determined by 403 against the current state and determine whether any security posture/ security protocol should be updated. The security update rate may be fixed or variable, depending on the system configuration.

At step 407, the system may identify the impacted security service if the security posture/security protocol is updated. For example, the system may identify the appropriate security protocol based on the state of the vehicle environment (e.g., based on the vehicle sensors) and identify certain vehicle features to activate or deactivate. Thus, a security protocol or posture may be identified that lists out the various actions that need to be implemented in response to the vehicle state inputs. At step 409, the system may send the security posture update to be executed by the cybersecurity controller 101. Thus, the cybersecurity controller 101 may send various commands to other controllers to activate or deactivate certain functions or modify the state of security-related services. For example, based on the desired security posture, the system may request the Wi-Fi, cellular, or Bluetooth controller to be activated or deactivated, intrusion detection algorithms may be enabled, disabled, or reconfigured, or general firewall rules are updated.

The system may be utilized in multiple use cases that are explained in the flowchart above. In one example, a vehicle may modify its security posture (e.g., security protocol) upon returning to an area defined as "home". Some preconditions (e.g., state of the vehicle or inputs collected by the vehicle from sensors, receivers, etc.) may be available, such as the various vehicle states or environments. For example, the vehicle may be in a security state that matches its current location (e.g., away from "home"). The 802.11 filter may be set to allow for V2V communication. Cellular interfaces may be enabled for V2I (vehicle-to-interface) communication. ZigBee or other smart home interfaces may be disabled. The smart-home applications may not be allowed to communicate over the wireless interfaces. Additional system privacy protections may be in place to protect personal information (e.g., calendar information, contacts, location, etc.). The vehicle's geographic location may be outside the predefined "home" location(s) (e.g., geo-fence). The Home Wi-Fi network may be out of range in such a scenario.

The vehicle may modify other aspects of its security posture if the system detects that the vehicle is returning home. The vehicle's wireless connectivity filtering may be adjusted to allow for better home connectivity while maintaining security. The V2V communication may be blocked, for example. In another embodiment, Zigbee or other smart-home interfaces (e.g., wireless communication) may be enabled during such a scenario. The Bluetooth filtering may allow pairing of a new device in that scenario.

The vehicle may determine that the driver is within the range of predefined "home" locations using any number of vehicle or environmental inputs. The vehicle may detect the home Wi-Fi network based on a predetermine home SSID and successful authentication to the network, in one embodiment. In another embodiment, the vehicle may detect a change in location via "geo-fencing" alone, based on a predefined perimeter around the "home" location(s). In another embodiment the vehicle may adjust wireless communication filter rules. In yet another embodiment, the vehicle may adjust privacy protection of stored data.

In a second use case scenario, the vehicle may lock down security in anticipation of overnight storage at home. The vehicle system may have several preconditions for this scenario, including that the vehicle is "off" (e.g., the ignition is turned off) or that the vehicle is in a security state that matches the "home" location determined by the previous security posture (e.g., a GPS sensor identifies the location with a defined home location). Some aspects of the security posture may be that the Wi-Fi connection is limited to based on the determination of a "home" SSID, ZigBee and other smart-home interfaces are disabled, Bluetooth pairing or remote key unlock is heavily rate-limited (for example, to protect against brute-force attacks), personally identifiable information may be encrypted and stored, host-based protections are set to a highest secure state for all systems (Bluetooth, Infotainment, etc.) such as activating fine-grained control flow graphs to protect against control flow attacks and runtime memory integrity checking as set to a high level.

In the second use case scenario, the vehicle may determine that it is appropriate to change the security state given that the vehicle is at home, based on connectivity to a home service set identifier (SSID) and/or geographic location, and that the vehicle has been in the "off" state for a threshold time (e.g., 1 hour), and that the time of day reaches a predetermined "nighttime" threshold (e.g., 10 PM or another time). The vehicle may also update the wireless security state to a "locked-down" state for storage. In another embodiment, the vehicle may encrypt personal information for long-term storage. In yet another embodiment, the vehicle may increase host-based security protections.

In a third use case scenario, the vehicle may anticipate that the owner is going to return to the vehicle soon based on past activity data or a stored calendar entry. The vehicle may change its security posture from a locked-down mode to a more relaxed mode that allows for more responsive performance and the use of stored personal information. For example, the responsiveness of the system may increase because the vehicle system is not communicating to cloud-based servers or only on-board devices, mitigating lag that occurs between long-range wireless communication. Some of the preconditions may include that the vehicle is parked at home (e.g., a GPS sensor identifies the location with a defined home location), "off" (e.g., ignition is turned off), and in a locked-down security mode determined by the previous security posture's postconditions. The security posture of the vehicle in the third scenario may include personally identifiable information decrypted for active use (such as calendar information, contacts, etc.), Bluetooth pairing or remote key unlock rate limits increased to allow for faster response, or if the geographic location is "home", ZigBee or other smart-home interfaces enabled. Another posture change may include that the Bluetooth host-based allows for the infotainment unit host-based protections to be in a relaxed security state to allow for more responsive user interaction. This may include allowing coarse-grained control flow graphs to be loaded to reduce CPU and memory utilization. Furthermore, runtime memory integrity checking may be relaxed to reduce CPU utilization.

In the third use case scenario, the vehicle may determine the need for the new security posture by periodically checking the current date and time against a predetermined or predicted time or heuristic determination of departure time based on past driver activity. Furthermore, the current date and time is within a time window (e.g., 30 minutes) of the predetermined and predicted time from the first step. The vehicle may also update the wireless security posture in anticipation of driver demand. In another embodiment, the vehicle may adjust host-based security mechanisms for more responsive user interaction. Consequently, the vehicle enters the security posture as previously described for this use case.

In a fourth use case scenario, the vehicle may depart from its parked location, enter the highway, and adjust its security posture to better communicate with other vehicles or infrastructure for safety or for autonomous driving. The vehicle may collect info from a map database to identify road class of the vehicle, as well as other inputs to identify the vehicle state or preconditions for such a scenario. The vehicle security system may also secure unneeded systems. Such precondition states of the vehicle may be that the vehicle is parked and in the security mode determined by the previous security posture.

In the fourth use case scenario, the security posture may make updates, such that the wireless filtering allows for V2V and to V2I communication. The 802.11 filters may be updated to match V2V or cellular interfaces are enabled for V2I. In another example, the 802.11 MAC address may be randomized/anonymized to protect user privacy.

Another post condition may be that the Bluetooth signal is filtered to disallow pairing of new devices. Furthermore, a ZigBee connection (or other smart-home interface) may be disabled. As such, smart-home applications may not be allowed to communicate over wireless interfaces.

In the fourth use case scenario, the vehicle may determine the need for the updated security posture from a driver entering the vehicle and turning it to an "on" state for the ignition setting. Then, the vehicle may leave the "home" location, as determined based on the "HOME" SSID being out of range and/or a geographic location being outside of the "HOME" perimeter (e.g., geofence). The vehicle may determine that speed and acceleration may also match that of highway driving (e.g., the vehicle is above a certain speed threshold). Furthermore, the vehicle may detect the presence of other vehicles via the presence of V2V communication signals or via the vehicle sensors (e.g., radar, LIDAR, camera, or other vehicle sensing inputs). The vehicle may then adjust the security posture to allow for better V2V/V2I communication. Furthermore, the vehicle may filter additional wireless interfaces. Consequently, the vehicle enters the security posture as previously described for this use case.

In a fifth use case scenario, the vehicle may adapt security protocols to allow for faster wireless communication and responsive performance due to the demand for video streaming or interactive gaming. The preconditions (e.g., inputs from vehicle sensor or other inputs) may include that the vehicle is traveling along the highway and in a security mode similar to those adapted from the fourth use case scenario's postconditions. The security posture of the fifth use case scenario may be that the wireless filtering is updated to prioritize video streaming as a "fast pass" rule. Furthermore, the infotainment unit may have host-based protections that are removed to allow for optimal performance, such as control flow integrity being disabled and runtime memory integrity checking being halted.

The vehicle may determine the need for the updated security posture through a number of different methods. For instance, the passenger may navigate on the infotainment screen to select a video for streaming. Next, the passenger begins to play the video. The infotainment system may enter a "video playback" streaming mode. Consequently, the infotainment system security posture is updated. Thus, additional screening of data from the streaming-video provider may occur if the streaming-video provider is unrecognized or unsecure.

In an alternative flow during the fifth use case scenario, the passenger may navigate on the infotainment screen to select an interactive video game to play. The passenger may then start the video game. Consequently, the infotainment system enters a "video game" mode and the infotainment system security posture is updated.

In a sixth use case scenario, the vehicle may remove security services in preparation for a vehicle crash to allow for communication with outside systems. The preconditions may include that the vehicle is traveling along the highway and in a security mode from the fourth use case scenario's postconditions. The security posture in the sixth scenario may include that all host-based security services are disabled, and all wireless filtering is removed. The vehicle may determine the need for this security posture in a number of ways, for instance it may be that the vehicle detects imminent collision through radar, LIDAR, camera, or general vehicle proximity and/or collision sensors. Consequently, the vehicle may update the security posture to enable full wireless communication and/or the vehicle may disable security services to free up system resources.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle computer system, comprising:
one or more sensors configured to receive input regarding a vehicle's environment; and
a controller in communication with the one or more sensors of a vehicle, wherein the controller is configured to:
identify a cyber-attack on one or more vehicle controllers in the vehicle;
determine whether a security posture associated with the vehicle computer system needs updating based upon at least a location associated with the vehicle's environment;
updating the security posture in response to the determination, wherein updating the security posture includes sending one or more requests to enable, disable, or reconfigure an intrusion detection algorithms; and
respond to the cyber-attack based upon at least the vehicle environment, wherein a response is associated with a security response database indicating one or more security postures include responses associated with both a type of cyber-attack and the vehicle environment, wherein the vehicle environment indicates a safe driving environment and the response includes either stopping the vehicle or degrading an operation of the vehicle.

2. The vehicle computer system of claim 1, wherein degrading the operator of the vehicle includes the controller being configured to send instructions to one or more vehicle controllers to slow a speed of travel of the vehicle in response to the input regarding the vehicle's environment indicating the vehicle exceeds a threshold speed during the cyber-attack.

3. The vehicle computer system of claim 1, wherein the controller is configured to reboot one or more vehicle controllers or processes in response to the cyber-attack on one or more vehicle controllers configured to control one or more driving functions of the vehicle and the vehicle environment indicating the safe driving environment.

4. The vehicle computer system of claim 1, wherein the one or more sensors includes a global position system (GPS) sensor configured to identify a geographic location of the vehicle and the controller is configured to either activate a cyber response in response to the geographic location of the vehicle.

5. The vehicle computer system of claim 4, wherein the geographic location of the vehicle is associated with a point of interest (POI) of the vehicle and the controller is configured to activate the cyber response in response to the POI.

6. The vehicle computer system of claim 4, wherein the geographic location of the vehicle is associated with a work location of the vehicle and the controller is configured to activate the cyber response in response to the work location.

7. The vehicle computer system of claim 1, wherein the one or more vehicle controllers are configured to provide memory map information to the controller in response to the cyber-attack.

8. The vehicle computer system of claim 1, wherein the one or more vehicle controllers are configured to provide memory register information to the controller in response to the cyber-attack.

9. The vehicle computer system of claim 1, wherein the one or more vehicle controllers are configured to provide memory trace information to the controller in response to the cyber-attack.

10. The vehicle computer system of claim 1, wherein updating the security posture includes sending one or more requests to one or more of a Wi-fi, cellular, or Bluetooth controller to be activated or deactivated.

11. A vehicle computer system, comprising:
one or more sensors configured to receive input regarding a vehicle's environment; and
a controller in communication with the one or more sensors, wherein the controller is configured to:
determine whether a vehicle security protocol associated with the vehicle computer system needs updating based upon at least a location associated with the vehicle's environment;
updating the vehicle security protocol in response to the determination, wherein updating the vehicle security protocol includes sending one or more requests to enable, disable, or reconfigure an intrusion detection algorithms;
identify a vehicle security protocol, including parameters to activate or deactivate vehicle controllers configured to communicate with external devices, in response to the input regarding the vehicle's environment, wherein the vehicle security protocol is associated with a security response database indicating one or more vehicle security protocols associated with both the cyber-attack and the vehicle environment, wherein the vehicle environment indicates a safe driving environment and the one or more vehicle security protocols includes either stopping the vehicle or degrading an operation of the vehicle;
and
execute the vehicle security protocol.

12. The vehicle computer system of claim 11, wherein the controller is further configured to determine that the vehicle computer system is not under a cyber-attack.

13. The vehicle computer system of claim 11, wherein the vehicle security protocol includes parameters to deactivate one or more Bluetooth controllers.

14. The vehicle computer system of claim 11, wherein the vehicle security protocol includes parameters to deactivate one or more Wi-Fi controllers.

15. The vehicle computer system of claim 11, wherein the vehicle security protocol includes parameters to activate one or more Wi-Fi controllers in response to one or more sensors receiving input regarding a vehicle's location at a point of interest location.

16. The vehicle computer system of claim 11, wherein the vehicle security protocol includes parameters to deactivate one or more sensors.

17. A vehicle computer system, comprising:
one or more sensors configured to receive input regarding a vehicle's environment; and
a security controller in communication with the one or more sensors, wherein the security controller is configured to:
determine whether a security protocol associated with the vehicle computer system needs updating based upon at least a location associated with the vehicle's environment;
updating the security protocol in response to the determination, wherein updating the security protocol includes sending one or more requests to enable, disable, or reconfigure an intrusion detection algorithms
identify a cyber-attack on one or more vehicle controllers in the vehicle;
respond to the cyber-attack based upon at least the vehicle environment;
determine the security protocol to activate, including parameters to activate or deactivate vehicle controllers configured to communicate with external devices, wherein the vehicle security protocol is associated with a security response database indicating one or more responses associated with both the cyber-attack and the vehicle environment, wherein the security controller is further configured to reboot the vehicle computer system in response to the input regarding the vehicle's environment being below a safety threshold; and
activate the security protocol.

18. The vehicle computer system of claim 17, wherein the security protocol is configured to reboot the one or more vehicle controllers.

19. The vehicle computer system of claim 17, wherein the security protocol is configured to stop operation of one or more vehicle controllers in response to the input regarding the vehicle's environment exceeds a safety threshold.

20. The vehicle computer system of claim 17, wherein the security controller is further configured to provide memory information to the security controller in response to the cyber-attack.

* * * * *